(12) United States Patent
Pollack et al.

(10) Patent No.: US 9,363,754 B2
(45) Date of Patent: Jun. 7, 2016

(54) MANAGING POWER CONSUMPTION IN MOBILE DEVICES

(71) Applicant: Apple Inc., Cupertino, CA (US)

(72) Inventors: Daniel B. Pollack, San Francisco, CA (US); Justin Wood, Sunnyvale, CA (US); Ray L. Chang, Sunnyvale, CA (US); Amit K. Vyas, San Jose, CA (US); Steve Parker, San Francisco, CA (US); Matthew Scott Klahn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/631,446

(22) Filed: Sep. 28, 2012

(65) Prior Publication Data

US 2014/0052774 A1      Feb. 20, 2014

Related U.S. Application Data

(60) Provisional application No. 61/684,223, filed on Aug. 17, 2012.

(51) Int. Cl.
*G06F 15/16*       (2006.01)
*H04W 52/02*     (2009.01)

(52) U.S. Cl.
CPC ............ *H04W 52/0241* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,157,941 A * | 12/2000 | Verkler et al. | 709/202 |
| 6,877,037 B1 * | 4/2005 | Adachi | 709/227 |
| 7,114,010 B2 * | 9/2006 | Karaoguz et al. | 709/250 |
| 7,569,810 B1 | 8/2009 | Troxler et al. | |
| 7,580,397 B2 | 8/2009 | Arai et al. | |
| 7,606,602 B2 | 10/2009 | Zhang et al. | |
| 8,351,892 B2 * | 1/2013 | Deng | 455/343.5 |
| 8,655,319 B2 * | 2/2014 | Clarke et al. | 455/412.1 |
| 8,897,152 B1 | 11/2014 | Caceres | |

(Continued)

FOREIGN PATENT DOCUMENTS

| | | |
|---|---|---|
| CN | 1722693 | 12/2011 |
| KR | 10-2004-0028956 | 4/2004 |

OTHER PUBLICATIONS

Translation of Office Action of the Intellectual Property Office in Taiwanese Patent Application No. 102128544, file Aug. 8, 2013. 10 pages.

(Continued)

*Primary Examiner* — Melvin H. Pollack
*Assistant Examiner* — Oluwatosin Gidado
(74) *Attorney, Agent, or Firm* — Fish & Richardson P.C.

(57) ABSTRACT

Computer-implemented methods, computer-readable media, and computer systems for managing power consumption in mobile devices are described. A mobile computer system executes a first computer application configured to receive data from a server system over a network, and a second computer application configured to periodically search for a connection to the network at a first time interval. In response to executing the second computer application, the mobile computer system determines that a strength of the connection is below a threshold strength. In response to determining that the strength of the connection is below the threshold strength, the computer system executes the first computer application to delay requesting data from the server system until the connection to the network is detected.

33 Claims, 8 Drawing Sheets

(56) References Cited

U.S. PATENT DOCUMENTS

| | | |
|---|---|---|
| 2004/0128382 A1 | 7/2004 | Shimoda |
| 2005/0181734 A1* | 8/2005 | Coutts et al. ............... 455/67.16 |
| 2005/0256968 A1* | 11/2005 | Johnson ....................... 709/232 |
| 2006/0282518 A1 | 12/2006 | Karaoguz et al. |
| 2006/0282519 A1 | 12/2006 | Trevathan et al. |
| 2007/0104158 A1* | 5/2007 | Liang et al. .................. 370/338 |
| 2007/0276931 A1* | 11/2007 | Mahdavi et al. ............. 709/223 |
| 2008/0025278 A1 | 1/2008 | Hoecker |
| 2010/0002582 A1 | 1/2010 | Luft |
| 2010/0017861 A1 | 1/2010 | Krishnaswamy et al. |
| 2010/0115048 A1 | 5/2010 | Scahill |
| 2011/0040867 A1* | 2/2011 | Kalbag ......................... 709/224 |
| 2011/0045763 A1 | 2/2011 | Mohanty |
| 2011/0081911 A1 | 4/2011 | Silver |
| 2011/0183723 A1 | 7/2011 | Kakii |
| 2011/0183726 A1 | 7/2011 | Deng |
| 2011/0230194 A1* | 9/2011 | Okuda ......................... 455/438 |
| 2011/0231547 A1* | 9/2011 | Yang et al. ................... 709/224 |
| 2011/0268089 A1 | 11/2011 | Jaynes et al. |
| 2012/0089845 A1 | 4/2012 | Raleigh |
| 2012/0258687 A1* | 10/2012 | Limont et al. ................ 455/411 |
| 2012/0324568 A1 | 12/2012 | Wyatt |
| 2014/0044007 A1 | 2/2014 | Smadi |
| 2014/0087765 A1* | 3/2014 | Jaynes et al. ............... 455/456.3 |
| 2014/0162629 A1 | 6/2014 | Tipton et al. |
| 2014/0171065 A1 | 6/2014 | Graessley |
| 2014/0365642 A1 | 12/2014 | Lam et al. |
| 2014/0365673 A1 | 12/2014 | Vyas et al. |
| 2014/0378131 A1 | 12/2014 | Rui |
| 2015/0128205 A1 | 5/2015 | Mahaffey |

OTHER PUBLICATIONS

International Preliminary Report on Patentability of the International Searching Authority for International Patent Application Serial No. PCT/US2013/055333, filed Aug. 16, 2013. 8 pp.

International Search Report and Written Opinion of the International Searching Authority, PCT Application Serial No. PCT/US2013/055333, Nov. 28, 2013, 10 pages.

* cited by examiner

MANAGING POWER CONSUMPTION IN MOBILE DEVICES

CROSS-REFERENCE TO RELATED APPLICATIONS

This application claims priority under 35 USC §119(e) to U.S. Patent Application Ser. No. 61/684,223, filed on Aug. 17, 2012, the entire contents of which are hereby incorporated by reference.

TECHNICAL FIELD

This disclosure relates generally to power consumption in mobile devices.

BACKGROUND

Power sources for mobile devices like smartphones, tablet computers, and laptop computers include batteries that store charge in addition to conventional power cables. The availability of batteries that store charge enable these devices to be used as wireless devices that can operate as long as sufficient charge is available in the batteries to execute functions. A mobile device can perform multiple functions including, for example, telephony functions, computer software functions, Global Positioning System (GPS) functions, and the like. Each function that the mobile device performs causes a portion of the battery power to be consumed. As the number of functions that the mobile device performs and a frequency at which the device performs each function increases, the life of the device's battery decreases.

SUMMARY

Computer-implemented methods, computer-readable media, and computer systems for managing power consumption in mobile devices are described.

In general, one innovative aspect of the subject matter described here can be implemented as a method by a mobile computer system. A first computer application configured to receive data from a server system over a network is executed. A second computer application configured to periodically search for a connection to the network at a first time interval is executed. In response to executing the second computer application, it is determined that the connection to the network is unavailable. In response to determining that the connection to the network is unavailable, the first computer application is executed to delay requesting data from the server system until the connection to the network is detected.

This, and other aspects, can include one or more of the following features. The second computer application can be executed to periodically search for the connection to the network at a second time interval that is greater than the first time interval. The second computer application can be executed at a time instant after the second time interval to search for the connection to the network. In response to executing the second computer application at the time instant, the connection to the network can be detected. In response to detecting the connection to the network, a time interval to search for the connection to the network can be decreased from the second time interval to the first time interval. In response to detecting the connection to the network, a notification can be transmitted to the first computer system to request the data from the server system. The first computer application can be an electronic mail application and the server system can be an electronic mail server system that stores electronic mail. The second computer application can be an automatic power save delivery application. Multiple computer applications, each configured to request data from a respective server system over the network, can be executed. Determining that the connection to the network is unavailable can include determining that a strength of the connection to the network is below a threshold strength. In response to determining that the strength of the connection is below the threshold strength, a respective notification can be transmitted to each of the multiple computer applications to delay requesting the data from the respective server system. The first computer application can be executed to not transmit a request for the data from the server system.

Another innovative aspect of the subject matter described here can be implemented as a method by a mobile computer system. A request for a connection to a network is transmitted periodically at a first time interval. An absence of a response from the network to the request for the connection is determined. An unavailability of the connection to the network is determined based on the absence of the response. In response to determining that the unavailability of the connection, subsequent requests for the connection to the network are periodically transmitted at a second time interval that is greater than the first time interval.

This, and other aspects, can include one or more of the following features. Multiple computer applications can be executed, wherein the request for data is transmitted by executing a first computer application. The multiple computer applications can be executed to select the first computer application to transmit the request for data. The first computer application can be executed to detect the connection at a time instance after the second time interval has expired. Determining the unavailability of the network can include determining that a strength of the connection to the network is unavailable. It can be determined that the strength of the connection has increased to at or above the threshold strength. A notification of the increase in the strength of the connection can be transmitted to remaining computer applications of the multiple computer applications. The first computer application can be executed to detect the connection at a time instance before the second time interval has expired. It can be determined that the strength of the connection has increased to at or above the threshold strength. A notification of the increase in the strength of the connection can be transmitted to remaining computer applications of the multiple computer applications. In response to determining that the strength of the connection is below the threshold strength, a second computer application can be executed to transmit requests for a respective connection to the network periodically at the second time interval. Determining that the strength of the connection to the network is below the threshold strength can include searching for the connection to the network for a duration of time. An absence of the connection to the network can be determined within the duration of time. The duration of time can be substantially one-third the first time interval. The request for the connection can be transmitted by a first computer application executing on the mobile computer system and a subsequent request for a respective connection to the network by a second computer application executing on the mobile computer system. The first computer application can be an electronic mail computer application.

A further innovative aspect of the subject matter described here can be implemented as a non-transitory computer-readable medium storing instructions executable by data processing apparatus to perform operations. The operations include executing a first computer application to search for a first connection to a network periodically at a first time interval, determining an absence of a response from the network to the search for the first connection within a first threshold time, determining an unavailability of the first connection based on the absence of the response, executing the first computer application to search for the first connection to the network at a second time interval that is greater than the first time interval, and executing a second computer application to transmit requests for data over the network periodically at the second time interval.

This, and other aspects, can include one or more of the following features. Determining the unavailability of the first connection can include determining that a strength of the connection is below a threshold strength. The operations can further include executing the first computer application to determine that the strength of the first connection has increased to at or above the threshold strength at a time instance before the second time interval has expired, and transmitting a notification of the increase in the strength of the first connection to the second computer application. The first computer application can be an automatic power save delivery application and the second computer application can be an electronic mail application executed to receive electronic mail. The network can be a cellular telephone network. Determining that the strength of the first connection is below the threshold strength can include executing the first computer application to search for the first connection to the network for a duration of time, and determining an absence of the first connection to the network within the duration of time. The duration of time can be substantially one-third the first time interval. The operations can further include executing the first computer application to search for the first connection at a time instance after the second time interval has expired, determining that the strength of the first connection to the network has increased to at or above the threshold strength, and executing the first computer application to search for the first connection for data over the network periodically at the first time interval. The operations can further include transmitting a notification to the second computer application to transmit requests for data over the network periodically at the first time interval.

An additional innovative aspect of the subject matter described here can be implemented as a system comprising data processing apparatus, and a computer-readable medium storing instructions executable by the data processing apparatus to perform operations. The operations include executing a first computer application to periodically transmit requests for a connection to a network at a respective first multiple instances separated by a first time interval, in response to the first computer application transmitting a request for the connection to the network at a first instance, determining an absence of a response, in response to determining the absence of the response, determining that the connection to the network is unavailable, and executing the first computer application to periodically transmit subsequent requests for connection to the network at a respective second plurality of instances separated by a second time interval that is greater than the first time interval.

This, and other aspects, can include one or more of the following features. Determining that the connection to the network is unavailable can include determining that a strength of the connection is below a threshold strength. The operations can further include executing the first computer application to determine that the strength of the connection to the network has increased to at or above the threshold strength within the second time interval, and transmitting a notification of the increase in the strength of the connection to multiple other computer applications, each of which is configured to transmit a respective request for the connection to the network. Determining the absence of the response can include determining the absence within a pre-defined duration of time from when a request for the connection is transmitted. The pre-defined duration of time can be substantially one-third the first time interval. The network can be a cellular telephone network. The second time interval can be substantially twice the first time interval.

The details of one or more implementations of managing power consumption in mobile devices are set forth in the accompanying drawings and the description below. Other features, aspects, and advantages of managing power consumption in mobile devices will become apparent from the description, the drawings, and the claims.

BRIEF DESCRIPTION OF THE DRAWINGS

Like reference symbols in the various drawings indicate like elements.

DETAILED DESCRIPTION

Figure 1:
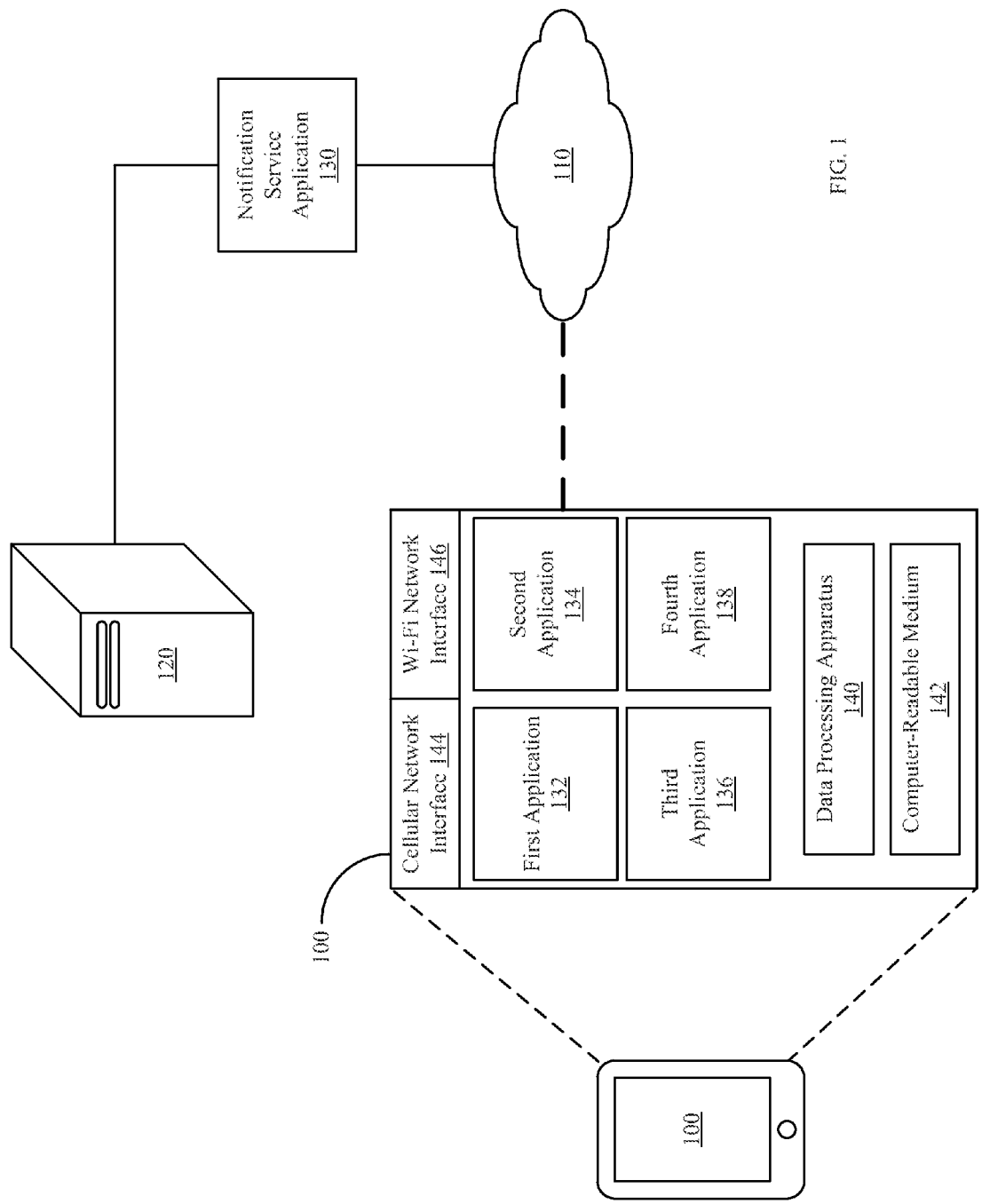
FIG. 1 illustrates an example mobile computer system for implementing power consumption management.

This disclosure generally describes computer-implemented methods, computer software, and computer systems for managing power consumption in mobile devices. Certain mobile devices are computer systems that implement wireless voice telephony and data transfer functionalities. Examples of such mobile devices include smartphones, laptop computers, tablet computers, personal digital assistants (PDAs), and the like. Such a mobile device can implement multiple computer software applications to perform operations. When connected to a network, the device can execute a computer software application to receive and transmit data from and to, respectively, a source that stores the data and that is also connected to the network. The network can be a cellular telephone network (for example, 3G network, LTE network) or a wireless network (for example, Internet, Wi-Fi) or a combination of them. For example, the mobile device can execute an electronic mail (e-mail) computer software application that can connect to a source, such as an email server system, over the network and receive email(s) for presenting on the mobile device.

The computer software application can be configured to connect the source and the mobile device such that data is pushed to the device, i.e., is automatically transmitted to the device without the device transmitting a request for data to the source. For example, the source that stores the data can send push notifications to the mobile device through a notification service application (such as a push notification service application) described below. The mobile device can be persistently connected to the notification service application as long as the mobile device is connected to a network.

In some situations, the mobile device may not be connected to a network, for example, because the device may be outside the range of a cellular telephony network or Wi-Fi service. In such situations, the mobile device can execute a computer software application to periodically search for a connection to the network so that the notification service application can detect the connection and push data to the mobile device. For example, the device can search for the connection once every 15 minutes (or a different time interval that is programmed in the computer software application). If the mobile device is within the range of the network, then the mobile device can connect to the network in a few seconds. However, if the device is not within the range of the network or the strength of the network is weak (for example, below a threshold strength), then up to several minutes may pass while the device searches for the network before eventually determining the absence of the network.

For example, a default polling interval to search for a connection can be $T_1$ minutes. In other words, the device can execute the computer software application once every $T_1$ minutes to search for a connection. Starting from a first time instant (for example, $t_1$), the device can execute the application for $\Delta t$ seconds. If the device is within the range of the network, then $\Delta t$ can be small, for example, a few seconds. If, however, the device is not within the range of the network, then $\Delta t$ can last several minutes. After $T_1$ minutes have elapsed from the first time instant ($t_1$), i.e., at a second time instant ($t_2$), the device can execute the computer software application again to search for the connection for $\Delta t$ seconds.

In such situations, each instance of the mobile device executing the computer software application at the default polling interval ($T_1$, in the foregoing example) to search for a connection to the network can drain the device's battery. Further, if the mobile device executes multiple computer software applications, each of which is associated with a respective default polling interval, then more of the device's battery power can be consumed for each instance of the device executing each application to search for a respective connection to the network. If, upon not detecting the connection to the network, the device continues to search for the connection at the default polling interval, then the device's battery will be drained faster than if the device searched for the connection at a different, longer polling interval.

By implementing the techniques described in this disclosure, the mobile device's battery consumption can be conserved when the device executes computer software applications to search for a connection to the network. To do so, in some implementations, the time interval at which the device searches for a connection to a network (i.e., the polling interval) can be increased when the device detects an absence of a connection to the network. For example, the device can execute a computer software application to search for the connection and determine the absence of the network. In response, the device can increase the time interval (i.e., the polling interval) for transmitting the next search for the connection. In addition, the device can transmit a notification to each computer software application that the device executes to periodically search for a respective connection to the network to also increase the corresponding time interval for transmitting the next search for the respective connection.

Implementing the techniques described here can provide one or more of the following advantages. When the mobile device is in an area in which there is no network service or a weak network strength, then the device's battery power can be conserved by causing the mobile device to search for a connection to the network at longer polling intervals relative to when the mobile device is in an area where there is a strong network service. The device's battery power can also be conserved by causing one of multiple computer software applications to search for the connection instead of each of the multiple applications searching for respective connections. When the device enters the strong network service area from the weak network service area, the device can be configured to decrease the time interval at which the device searches for the network.

FIG. 1 illustrates an example mobile device 100 in which power consumption management is implemented. The mobile device 100 is connected to a server computer system 120 through one or more wired or wireless networks 110, for example, a cellular telephone network, the Internet, a Wi-Fi network, or a combination of them. The server computer system 120 stores data that can be pushed to the mobile device 100 by a notification service application 130, which is configured to propagate information to devices such as the mobile device 100. The mobile device 100 can establish a connection (for example, an accredited and encrypted Internet Protocol connection) with the notification service application 130, and can receive notifications from the server computer system 120 over this persistent connection.

In some implementations, the mobile device 100 can implement multiple computer applications (for example, a first application 132, a second application 134, a third application 136, and a fourth application 138). Each computer application can be implemented as respective computer software instructions that are executable by data processing apparatus 140 to perform respective operations. The instructions can be stored on a computer-readable medium 142. For example, the first application 132 can be a first email application, the second application 134 can be a second email application, the third application 136 can be a weather service application, and the fourth application 138 can be a news application. The mobile device 100 can execute additional computer applications (not shown). In addition, the device 100 can implement an automatic power save delivery (APSD) application that, when executed, can maintain a connection with the notification service application 130.

One or more or all of the computer applications that the mobile device 100 executes can be connected to the same notification service application 130 or a respective notification service application, which, in turn, can be connected to a respective server system that can transmit data to the mobile device 100 through the notification service application. If the notification service application 130 transmits a notification for a computer application when that application is not running, the mobile device 100 can be configured to alert a user that the application has received data. The server system 120 can include the notifications in the server system software. The server system 120 can connect with the notification service application 130 through a persistent and secure channel while monitoring incoming data intended for the respective computer application executing on the mobile device 100. When the server system 120 receives new data, for example, for the first computer application 132, the server system 120 can prepare and send a notification through the channel to the notification service application 130, which can push the notification to the mobile device 100.

The mobile device 100 can include a cellular network interface 144 and a Wi-Fi network interface 146. Through either or both network interfaces, the device 100 can transmit a request for a connection to the network 110. In some implementations, the device 100 can be configured to transmit the request periodically at a first time interval. For example, the first application 132 can be configured to be executed by the device 100 to transmit the request for the connection once every 15 minutes. This default time interval can be altered responsive to user input received, for example, from a user of the mobile device 100.

If the mobile device 100 is within a range of the network 110, then the device 100 can connect to the network 110 and the first application 132 can receive push notifications, if any, from the notification service application 130. Similarly, the device 100 can execute each application that is configured search for the connection to transmit a respective request at respective time intervals for a respective connection to the network 110. The device 100 can transmit all the requests simultaneously or at different times. Further, after connecting to the network 110, the device 100 need not transmit requests searching for the network 110.

If, on the other hand, the mobile device 100 is not within a range of the network 110, then the device 100 can determine an absence of a response from the network 110 to the request for the connection. From such an absence, the device 100 can determine that the connection to the network is unavailable. The connection to the network may be unavailable because a strength of the connection to the network is below a threshold strength. For example, the device 100 can determine that the device 100 is not within a range of the network 110. In response to determining that the strength of the connection is below the threshold strength, the device 100 can change the interval at which requests for the connection to the network are transmitted from the first time interval to a second time interval that is greater than the first time interval. For example, the second time interval can be 30 minutes whereas the first time interval was 15 minutes.

The connection to the network 110 may be unavailable for reasons other than or in addition to the strength of the connection being below the threshold strength. For example, the device 100 may have bad or no connectivity to the network 110 via Wi-Fi or WWAN. Some problems with the network 110, for example, an improper firewall, may prevent the connection from being established. A notification service application that is almost always connected to the network 110 may not be functioning resulting in an indication of an absence of the connection although the connection is present.

The determination to increase the time interval from the first time interval (for example, 15 minutes) to the second time interval (for example, 30 minutes) can depend, for example, the power conditions to which the mobile device 100 is exposed. Alternatively, or in addition, the determination to increase the time interval can be based on a time for which the mobile device 100 searches for the connection before determining an absence of the connection. In some implementations, if the search time is substantially one-third the time interval, then the mobile device 100 can increase the time interval. For example, if the device 100 is configured to search for the connection once every 15 minutes and does not detect a connection after 5 minutes of searching, then the device 100 can determine to increase the time interval from 15 minutes to 30 minutes. In another example, if the default time interval is 30 minutes and the device 100 executes an application for 10 minutes to determine the absence of the connection, then the time interval can be increased from 30 minutes to, for example, one hour. If, however, the search time is a very small fraction of the time interval (for example, $1/10^{th}$), then the device 100 may not increase the time interval even if the device 100 does not detect a connection.

In some implementations, the determination to increase the time interval can depend on whether the mobile device 100 is connected to the notification service application 130. The device 100 can execute the APSD application that is configured to maintain a persistent connection with the notification service application 130. For example, when the device 100 executes the APSD application and determines a connection to the notification service application 130, then the device 100 can determine to maintain the polling interval at the first time interval. Conversely, when the device 100 executes the APSD application and detects an absence of a connection to the notification service application 130, then the device 100 can increase the time interval from the first time interval to the second time interval. Subsequently, when the device 100 executes the APSD application and detects the connection to the notification service application 130, then the device 100 can decrease the time interval back to the first time interval.

Since the mobile device 100 can receive data from a respective server system of each executed application through the network 110, the device 100 need execute only the APSD application to search for a connection to the network 110. Once the device 100 executes the APSD application and detects a connection to the network, the remaining applications need not be executed to search for respective connections. Rather, once the device 100 determines that there exists the connection to the network 110, the device 100 can execute the remaining applications to receive data from the respective server systems through respective connections. Because the device 100 executes the remaining applications after determining that the connection to the network 110, the device 100 need not execute each of the remaining applications to search for a respective connection to a respective server system. As a result, the device's battery power can be conserved.

In some implementations, the various applications can be configured to identify an application that the mobile device 100 can execute to search for the connection. For example, the first application 132 can be executed at a first instance after the second time interval expires, the second application 132 can be executed at a second instance after the first instance, the third application 132 can be executed at a third instance, and so on. Alternatively, the computer software application that will draw the least battery power when executed to search for the connection can be identified and executed.

In some implementations, as the mobile device 100 executes the first application 132 to periodically transmit a request for the connection to the network 110 at the second time interval, the device 100 can detect the connection, for example, because the device 100 is within the range of the network 110. For example, the device 100 can detect the connection by determining that a strength of the connection is at or above the threshold strength. In response, the device 100 can decrease the time interval of the first application 132 from the second time interval to the first time interval. In addition, the device 100 can transmit a notification to each of the second, third, and fourth applications to also decrease the respective time intervals to the first time interval.

In some implementations, the mobile device 100 can execute an interruption to decrease the time interval from the second interval to the first interval. An interruption occurs when, at a first instance, the mobile device 100 did not detect a connection to the network 110 resulting in an increase in the polling interval, and before searching again at the increased polling interval, the device 100 detected a connection. An interruption can occur because the mobile device 100 detected a connection to the notification service application 130 before the second time interval expired. In such implementations, the mobile device 100 can transmit a notification to all the computer applications that the connection has been detected. In response, one or more of the applications can be executed to connect to the network 100 and receive any push notifications. Also, one or more of the applications can be executed to decrease the time interval for searching for the network 110 from the second time interval to the first time interval.

Figure 2A:
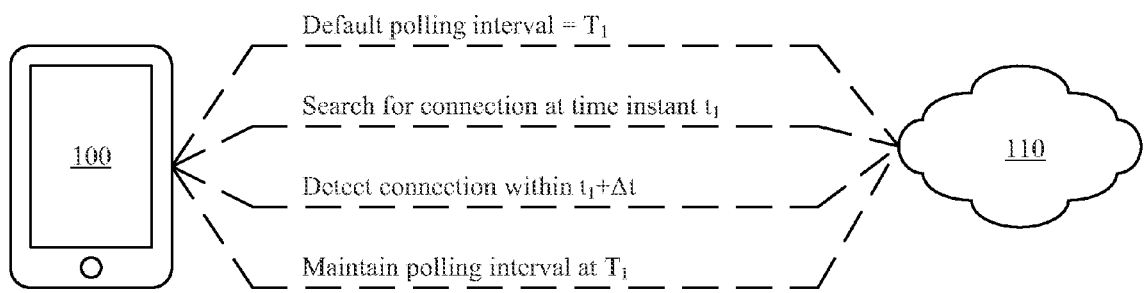
FIGS. 2A-2D illustrate example implementations of power consumption management in mobile devices.

FIGS. 2A-2D illustrate example implementations of power consumption management in mobile devices. FIG. 2A is an example implementation in which the mobile device 100 searches for a connection to the network 100 at a polling interval and, upon detecting the connection, maintains the polling interval. The device 100 can execute the first computer application 132 that has a default polling interval of $T_1$. For example, $T_1$ can be 15 minutes. At time instant $t_1$, the device 100 can search for a connection to the network 110. At time instant $t_1+\Delta t$, the device 100 can detect the connection to the network 110. The time increment $\Delta t$ can be very small relative to $T_1$. For example, $\Delta t$ can be of the order of tens of seconds. Because the device 100 detected the connection to the network 110 within seconds after searching for the connection, the device 100 can maintain the polling interval for the first computer application 132 at $T_1$ and need not search for the connection again.

Figure 2B:
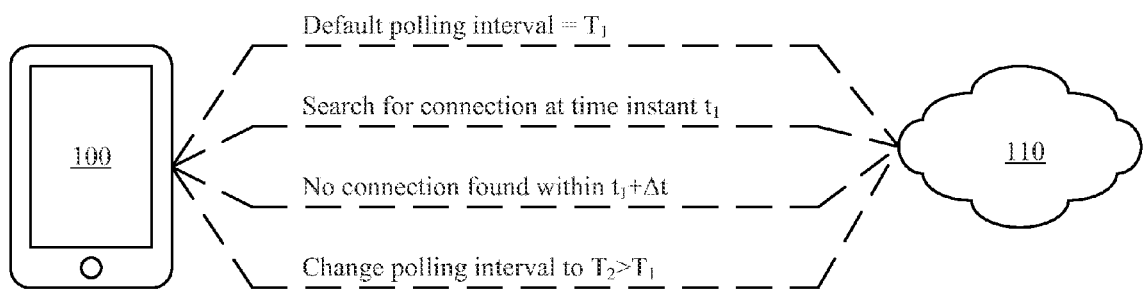

FIG. 2B is an example implementation in which the mobile device 100 determines an absence of a connection to the network 100. At time instant $t_1$, the device 100 can search for the connection to the network 110. At time instant $t_1+\Delta t$, the device 100 may not have detected the connection to the network 110. In this example, $T_1$ can be 15 minutes and $\Delta t$ can be of the order of several minutes, such as, 10 minutes. Because the device 100 detected the absence of the connection despite several minutes having expired, the device 100 can change the polling interval to $T_2$ (for example, 30 minutes) which is greater than $T_1$. As described above, the device 100 can change the polling interval based on a comparison of $\Delta t$ to $T_1$. If $\Delta t$ is small compared to $T_1$, then the device 100 may not increase the polling interval. If $\Delta t$ is large compared to $T_1$, then the device 100 may select $T_2$ such that $\Delta t$ is small compared to $T_2$. The next time instant at which the device 100 searches for the network (for example, $t_2$) occurs $T_2$ minutes after $t_1$.

Figure 2C:
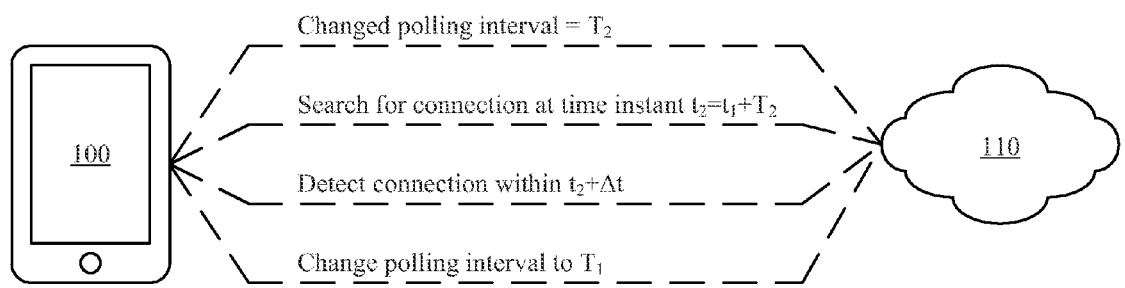
Figure 2D:
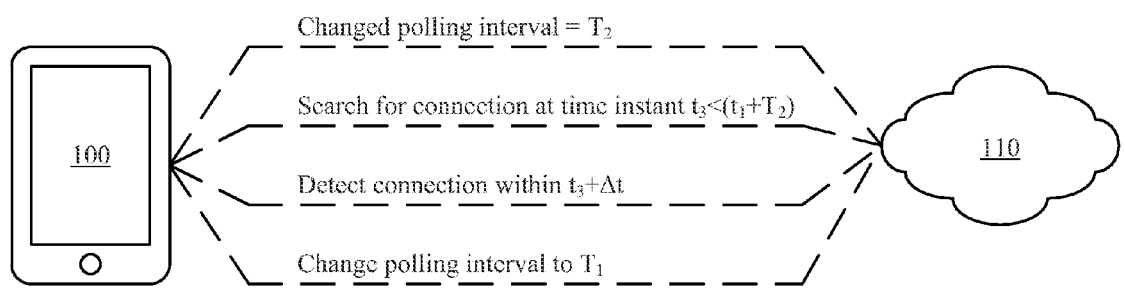

FIG. 2C is an example implementation in which the mobile device 100 decreases the polling interval from $T_2$ to $T_1$. After changing the polling interval to $T_2$, the device 100 searches for a connection to the network 110 at time instant $t_2 (=t_1+T_2)$. The device 100 detects a connection within $t_2+\Delta t$. In response, the device 100 changes the polling interval to $T_1$. Because the device 100 has detected the connection to the network 110, the device 100 need not search for the connection again. FIG. 2D is an example of an interruption in which the mobile device 100 decreases the polling interval from $T_2$ to $T_1$. After changing the polling interval to $T_2$, the device 100 detects a connection to the network 110 at time instant $t_3$ ($<t_1+T_2$) which is before than the next time instant $t_2 (=t_1+T_2)$ at which the device 100 would have searched for the connection. In response to detecting the connection, the device 100 can change the polling interval from $T_2$ to $T_1$.

Figure 3:
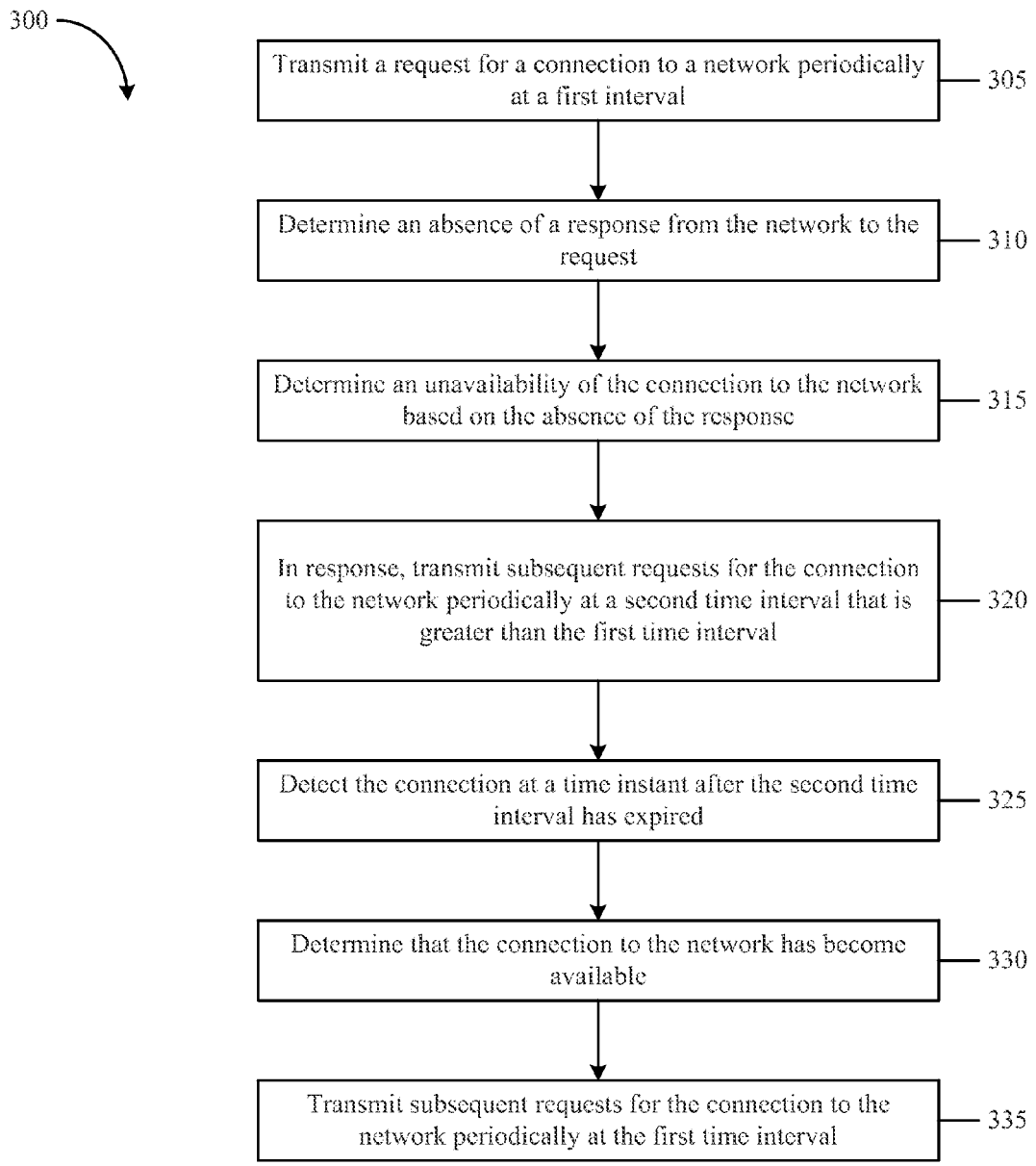
FIG. 3 is a flowchart of a first implementation of a process for managing power consumption in mobile devices.

FIG. 3 is a flowchart of a first implementation of a process 300 for managing power consumption in mobile devices. The process 300 can be implemented on a computer system (for example, the mobile device 100) as computer instructions stored on a computer-readable medium and executed by data processing apparatus. At 305, a request for a connection to a network is periodically transmitted. At 310, an absence of a response from the network to the request is determined. At 315, it is determined that the connection to the network is unavailable. In response, at 320, subsequent requests for the connection to the network are periodically transmitted at a second time interval that is greater than the first time interval. At 325, the connection is detected at a time instant after the second time interval has expired. At 330, it is determined that the connection to the network has become available. At 335, subsequent requests for the connection to the network are transmitted periodically at the first time interval.

Figure 4:
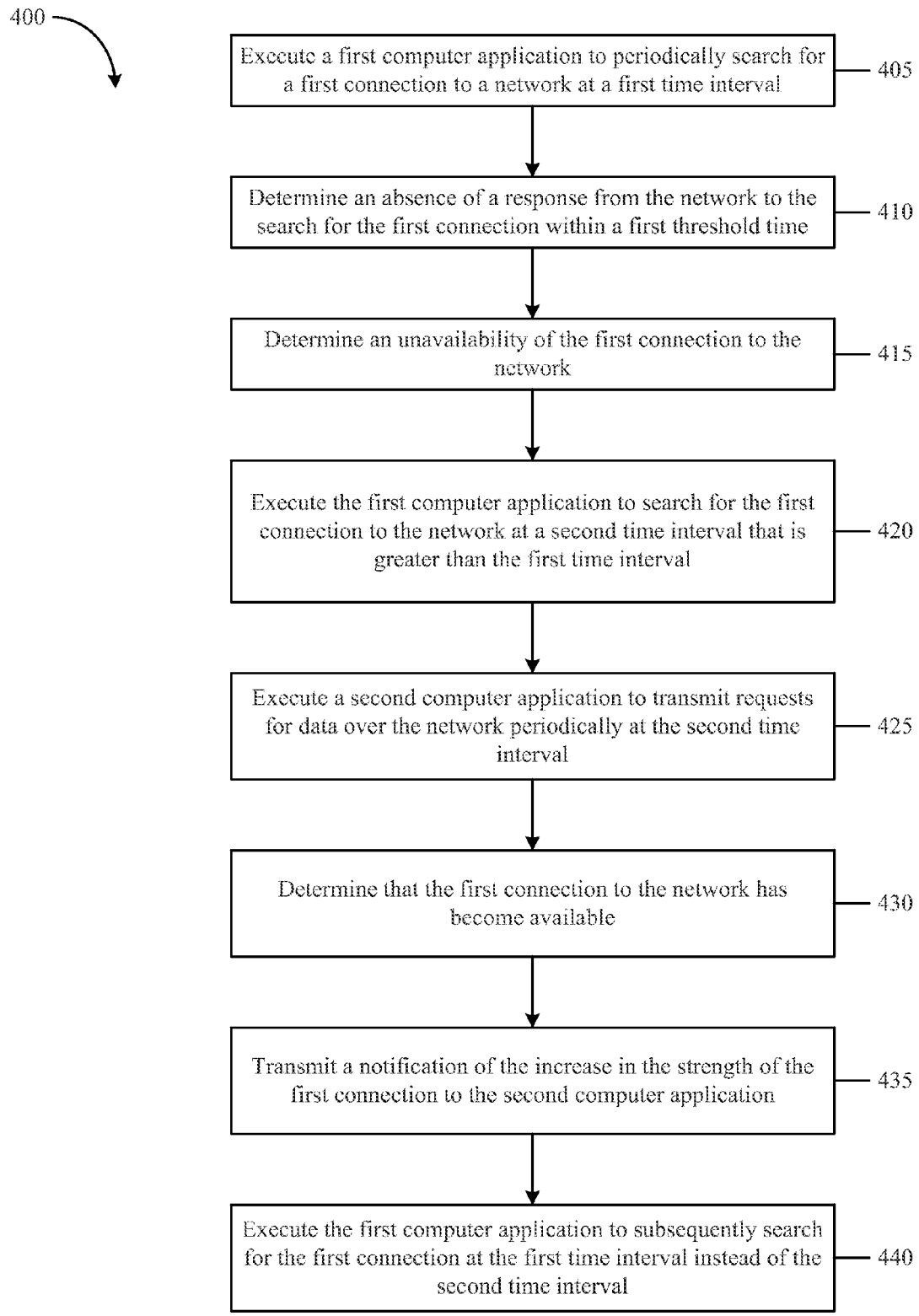
FIG. 4 is a flowchart of a second implementation of a process for managing power consumption in mobile devices.

FIG. 4 is a flowchart of a second implementation of a process 400 for managing power consumption in mobile devices. The process 400 can be implemented on a computer system (for example, the mobile device 100) as computer instructions stored on a computer-readable medium and executed by data processing apparatus. At 405, interval first computer application is executed to periodically search for a first connection to a network at a first time interval. At 410, an absence of a response from the network to the search for the first connection within a first threshold time is determined. At 415, an unavailability of the first connection to the network is determined. Responsive to the determination, at 420, the first computer application is executed to search for the first connection to the network at a second time interval that is greater than the first time interval. At 425, the second computer application is executed to transmit requests for data over the network periodically at the second time interval. At 430, it is determined that the first connection to the network has become available. At 435, a notification of the increase in the strength of the first connection is transmitted to the second computer application. At 440, the first computer application is executed to subsequently search for the first connection at the first time interval instead of the second time interval.

Figure 5:
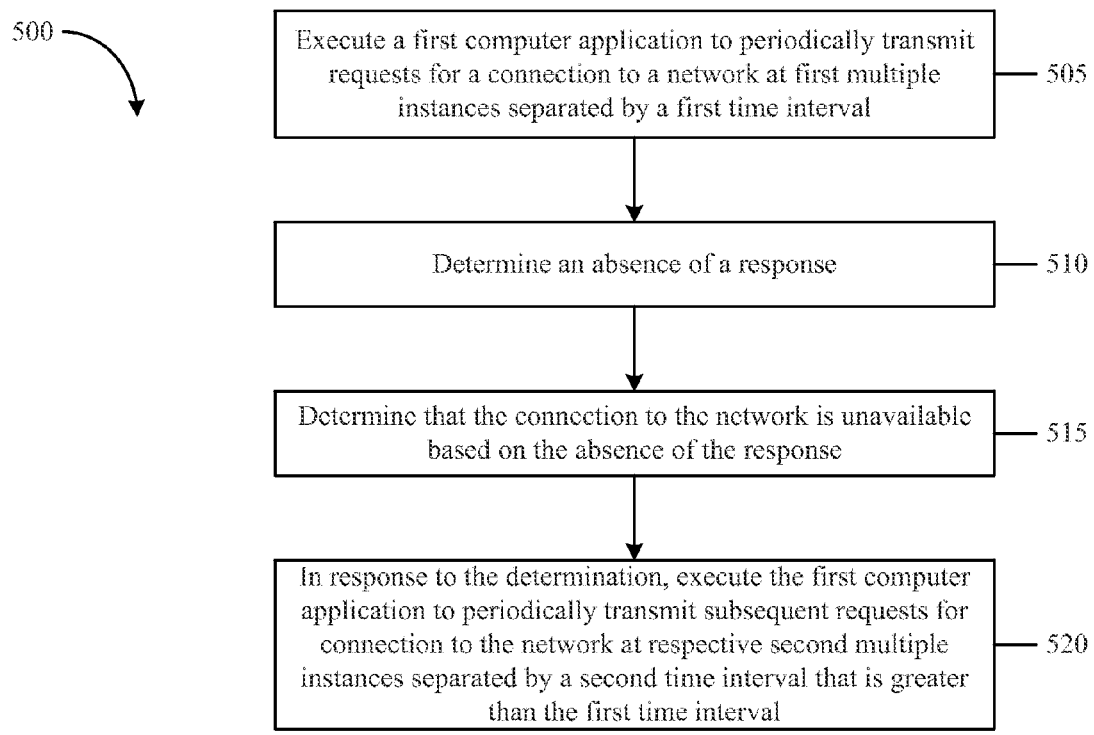
FIG. 5 is a flowchart of a third implementation of a process for managing power consumption in mobile devices.

FIG. 5 is a flowchart of a third implementation of a process 500 for managing power consumption in mobile devices. The process 500 can be implemented on a computer system (for example, the mobile device 100) as computer instructions stored on a computer-readable medium and executed by data processing apparatus. At 505, a first computer application is executed to periodically transmit requests for a connection to a network at first multiple instances separated by a first time interval. At 510, an absence of a response to a request for the connection is determined. At 515, it is determined that the connection to the network is unavailable based on the absence of the response. In response to the determination, at 520, the first computer application is executed to periodically transmit subsequent requests for connection to the network at respective second multiple instances separated by a time interval that is greater than the first time interval.

Figure 6:
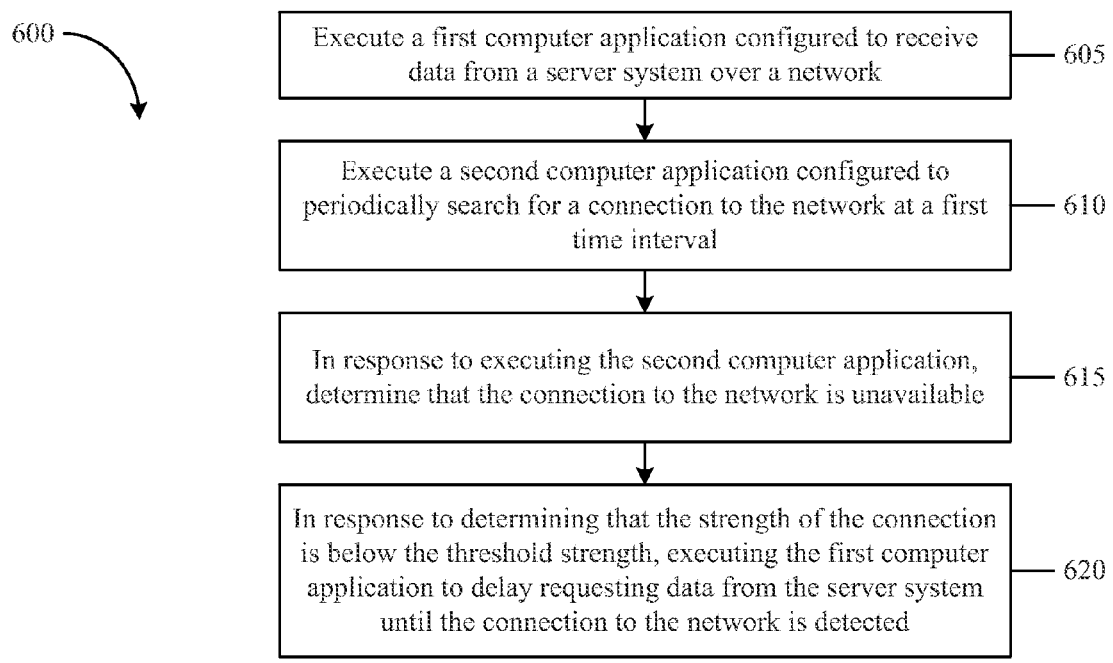
FIG. 6 is a flowchart of a fourth implementation of a process for managing power consumption in mobile devices.

FIG. 6 is a flowchart of a fourth implementation of a process 600 for managing power consumption in mobile devices. The process 600 can be implemented on a computer system (for example, the mobile device 100) as computer instructions stored on a computer-readable medium and executed by data processing apparatus. At 605, a first computer application, which is configured to receive data from a server system over a network, can be executed. At 610, a second computer application, which is configured to periodically search for a connection to the network at a first time interval, can be executed. At 615, in response to executing the second computer application, it can be determined that the connection to the network is unavailable. At 620, in response to determining that the strength of the connection is below the threshold strength, the first computer application can be executed to delay requesting data from the server system until the connection to the network is detected.

In addition, the second computer application can be executed to periodically search for the connection to the network at a second time interval that is greater than the first time interval. The second computer application can be executed at a time instant after the second time interval to search for the connection to the network. In response to executing the second computer application at the time instant, the connection to the network can be determined. In response to detecting the connection to the network, a time interval to search for the connection to the network can be decreased from the second time interval to the first time interval. Executing the first computer application to delay requesting data from the server system can include executing the first computer application to periodically request the data at the second time interval instead of the first time interval. Alternatively, the first computer application can be executed to not request the data until the connection is detected. The first computer application can be an electronic mail application and the second computer application can be an APSD application.

Figure 7:
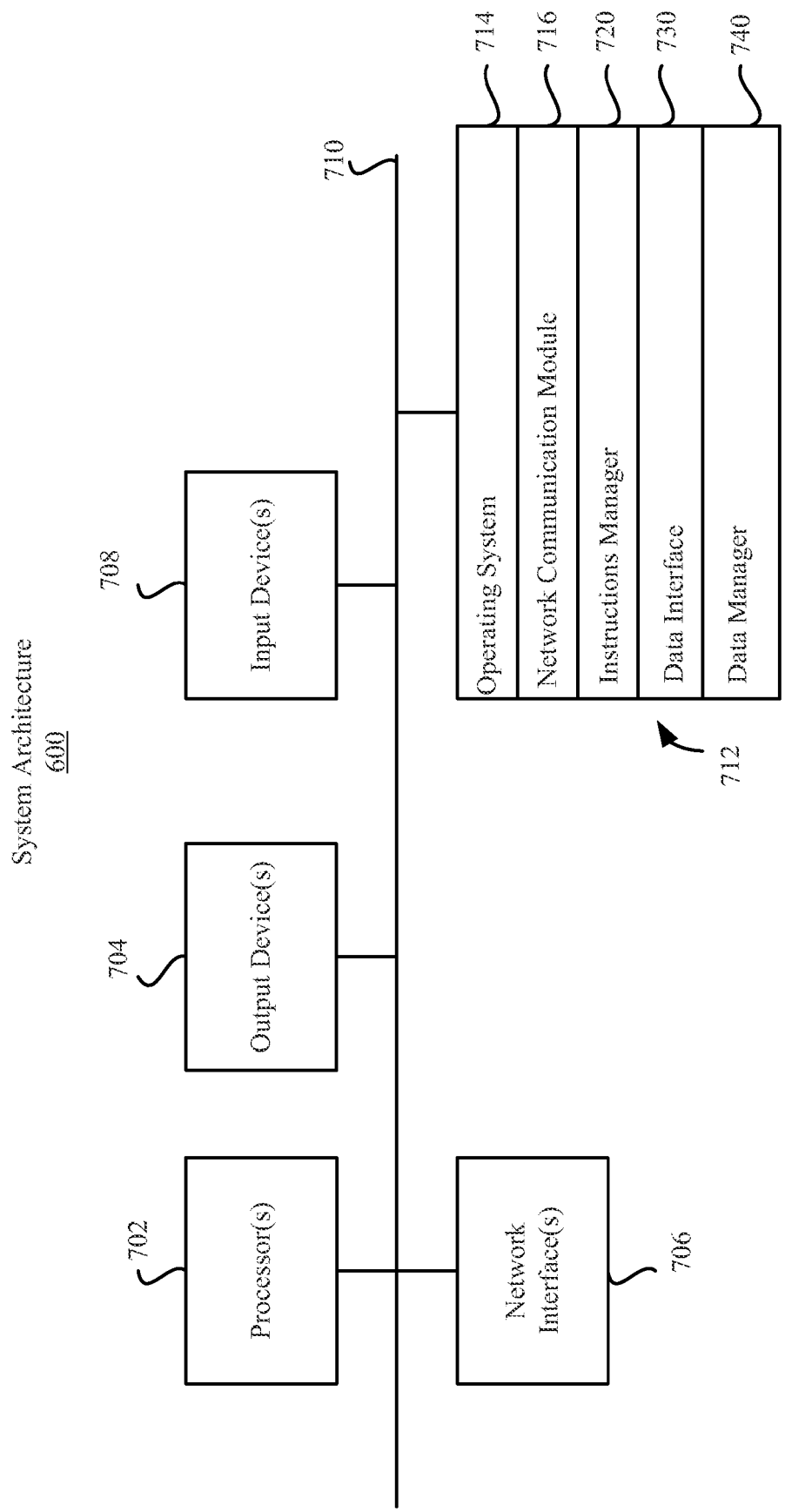
FIG. 7 is a block diagram of an exemplary architecture for implementing the features and operations of FIGS. 1-6.

FIG. 7 is a block diagram of exemplary system architecture 700 for implementing the features and operations of FIGS. 1-5. Other architectures are possible, including architectures with more or fewer components. In some implementations, architecture 700 includes one or more processors 702 (for example, dual-core Intel® Xeon® Processors), one or more output devices 704 (for example, LCD), one or more network interfaces 706, one or more input devices 708 (for example, mouse, keyboard, touch-sensitive display) and one or more computer-readable mediums 712 (for example, RAM, ROM, SDRAM, hard disk, optical disk, flash memory, etc.). These components can exchange communications and data over one or more communication channels 710 (for example, buses), which can utilize various hardware and software for facilitating the transfer of data and control signals between components.

The term "computer-readable medium" refers to a medium that participates in providing instructions to processor 702 for execution, including without limitation, non-volatile media (for example, optical or magnetic disks), volatile media (for example, memory) and transmission media. Transmission media includes, without limitation, coaxial cables, copper wire and fiber optics.

Computer-readable medium 712 can further include operating system 714 (for example, a Linux® operating system), network communication module 716, instructions manager 720, data interface instructions 730, and data manager instructions 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (for example, memory or a storage device); controlling peripheral devices; and managing traffic on the one or more communication channels 710. Network communications module 716 includes various components for establishing and maintaining network connections (for example, software for implementing communication protocols, such as TCP/IP, HTTP, etc.).

Instructions manager 720 can include computer instructions that, when executed, cause processor 702 to perform operations described above. Data interface instructions 730 can include computer instructions that, when executed, cause processor 702 to perform operations as described above. Data manager instructions 740 can include computer instructions that, when executed, cause processor 702 to perform operations as described above in reference to data manager 404.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (for example, Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user, and a touch screen input device or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a client device (for example, for purposes of displaying data to and receiving user input from a user interacting with the client device). Data generated at the client device (for example, a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A computer-implemented method comprising:
executing, by a mobile computer system, a first computer application configured to receive data from a server system over a network;
identifying, by the mobile computer system, a second computer application from among a plurality of computer applications, wherein identifying the second computer application comprises determining that the second computer application will draw the least battery power from among the plurality of computer applications when executed to search for a connection to the network;
executing, by the mobile computer system, the second computer application to periodically search for the connection to the network at a first time interval;
in response to executing the second computer application, determining, by the mobile computer system, that the connection to the network is unavailable; and
in response to determining that the connection to the network is unavailable, transmitting the notification to the first computer application, wherein the first computer application suspends data requests to the server system when the notification is received.

2. The method of claim 1, further comprising executing the second computer application to periodically search for the connection to the network at a second time interval that is greater than the first time interval.

3. The method of claim 2, further comprising:
executing the second computer application at a time instant after the second time interval to search for the connection to the network;
in response to executing the second computer application at the time instant, detecting the connection to the network; and
in response to detecting the connection to the network, decreasing a time interval to search for the connection to the network from the second time interval to the first time interval.

4. The method of claim 3, further comprising, in response to detecting the connection to the network, transmitting a second notification to the first computer application to request the data from the server system.

5. The method of claim 1, wherein the first computer application is an electronic mail application, and wherein the server system is an electronic mail server system that stores electronic mail.

6. The method of claim 1, wherein the second computer application is an automatic power save delivery application.

7. The method of claim 1, wherein determining that the connection to the network is unavailable comprises determining that a strength of the connection is below a threshold strength.

8. The method of claim 7, further comprising:
executing a second plurality of computer applications, wherein each of the second plurality of computer applications is configured to request data from a respective server system over the network and to suspend data requests to the respective server system when a respective notification is received; and
in response to determining that the strength of the connection is below the threshold strength, transmitting the respective notification to each of the second plurality of computer applications.

9. A computer-implemented method comprising:
executing, by a mobile computer system, a plurality of computer applications, wherein each of the plurality of computer application is configured to request data from a network;
selecting, by the mobile computer system, a first computer application from the plurality of computer applications, to periodically transmit a request for a connection to the network at a first time interval, wherein selecting the first computer application comprises determining that the first computer application will draw the least battery power from among the plurality of computer applications when executed to search for the connection to the network;
determining, by the mobile computer system, an absence of a response from the network to the request for the connection;
determining, by the mobile computer system, an unavailability of the connection to the network based on the absence of the response; and
in response to determining that the connection to the network is unavailable:

transmitting a notification to each of the plurality of computer applications other than the first computer application to suspend data requests to the network; and transmitting subsequent requests for the connection to the network periodically at a second time interval that is greater than the first time interval.

10. The method of claim 9, wherein determining the unavailability of the connection to the network comprises determining that a strength of the connection to the network is below a threshold strength.

11. The method of claim 10, further comprising:
executing the first computer application to detect the connection at a time instance after the second time interval has expired;
determining that the strength of the connection has increased to at or above the threshold strength; and
in response to determining that the strength of the connection has increased to at or above the threshold strength, transmitting, by the mobile computer system, a second notification to each of the plurality of computer applications other than the first computer application to request the data from the server system.

12. The method of claim 10, further comprising:
executing the first computer application to detect the connection at a time instance before the second time interval has expired;
determining that the strength of the connection has increased to at or above the threshold strength; and
transmitting a second notification to each of the plurality of computer applications other than the first computer application to request the data from the server system.

13. The method of claim 10, further comprising, in response to determining that the strength of the connection is below the threshold strength, executing a second computer application from the plurality of computer applications to transmit requests for a respective connection to the network periodically at the second time interval.

14. The method of claim 10, wherein determining that the strength of the connection to the network is below the threshold strength comprises:
searching for the connection to the network for a duration of time; and
determining an absence of the connection to the network within the duration of time.

15. The method of claim 14, wherein the duration of time is substantially one-third the first time interval.

16. The method of claim 9, wherein the request for the connection is transmitted by the first computer application executing on the mobile computer system and a subsequent request for a respective connection to the network by a second computer application from the plurality of computer applications executing on the mobile computer system.

17. The method of claim 16, wherein the first computer application is an electronic mail computer application.

18. A non-transitory computer-readable medium storing instructions executable by data processing apparatus to perform operations comprising:
identifying a first computer application from among a plurality of computer applications, wherein identifying the first computer application comprises determining that the first computer application will draw the least battery power from among the plurality of computer applications when executed to search for a first connection to a network;

executing the first computer application to search for the first connection to the network periodically at a first time interval;
determining an absence of a response from the network to the search for the first connection within a first threshold time;
determining an unavailability of the first connection to the network based on the absence of the response;
executing the first computer application to search for the first connection to the network at a second time interval that is greater than the first time interval; and
transmitting a notification to a second computer application to transmit requests for data over the network periodically at the second time interval.

19. The medium of claim 18, the operations further comprising:
executing the first computer application to determine that the strength of the first connection has increased to at or above the threshold strength at a time instance before the second time interval has expired; and
transmitting a notification of the increase in the strength of the first connection to the second computer application.

20. The medium of claim 18, wherein the first computer application is an automatic power save delivery application and the second computer application is an electronic mail application executed to receive electronic mail.

21. The medium of claim 18, wherein the network is a cellular telephone network.

22. The medium of claim 18, wherein determining the unavailability of the first connection comprises determining that the strength of the first connection is below a threshold strength.

23. The medium of claim 22, wherein determining that the strength of the first connection is below the threshold strength comprises:
executing the first computer application to search for the first connection to the network for a duration of time; and
determining an absence of the first connection to the network within the duration of time.

24. The medium of claim 23, wherein the duration of time is substantially one-third the first time interval.

25. The medium of claim 18, the operations further comprising:
executing the first computer application to search for the first connection at a time instance after the second time interval has expired;
determining that the strength of the first connection to the network has increased to at or above the threshold strength; and
executing the first computer application to search for the first connection for data over the network periodically at the first time interval.

26. The medium of claim 25, the operations further comprising transmitting a notification to the second computer application to transmit requests for data over the network periodically at the first time interval.

27. A system comprising:
data processing apparatus; and
a computer-readable medium storing instructions executable by the data processing apparatus to perform operations comprising:
identifying a first computer application from among a plurality of computer applications, wherein the first computer application is identified based on an amount of battery power that each of the plurality of computer applications will draw when executed to search for a connection to a network;

executing the first computer application to periodically transmit requests for the connection to the network at a respective first plurality of instances separated by a first time interval;

in response to the first computer application transmitting a request for the connection to the network at a first instance, determining an absence of a response; and in response to determining the absence of the response:
  determining that the connection to the network is unavailable;
  executing the first computer application to periodically transmit subsequent requests for connection to the network at a respective second plurality of instances separated by a second time interval that is greater than the first time interval; and
  transmitting a notification to a second computer application to suspend data requests to the network.

28. The system of claim 27, wherein determining that the connection to the network is unavailable comprises determining that a strength of the connection to the network is below a threshold strength.

29. The system of claim 28, the operations further comprising:
  executing the first computer application to determine that the strength of the connection to the network has increased to at or above the threshold strength within the second time interval; and
  transmitting a notification of the increase in the strength of the connection to a plurality of other computer applications, each of which is configured to transmit a respective request for the connection to the network.

30. The system of claim 28, wherein determining the absence of the response comprises determining the absence within a pre-defined duration of time from when a request for the connection is transmitted.

31. The system of claim 30, wherein the pre-defined duration of time is substantially one-third the first time interval.

32. The system of claim 27, wherein the network is a cellular telephone network.

33. The system of claim 27, wherein the second time interval is substantially twice the first time interval.

* * * * *